(12) United States Patent
Ko et al.

(10) Patent No.: US 6,989,418 B2
(45) Date of Patent: Jan. 24, 2006

(54) AQUEOUS FILM-FORMING MIXTURES AND CONFORMABLE FILMS AND ARTICLES MADE THEREFROM

(75) Inventors: Chan U. Ko, Arcadia, CA (US); Aren Joost de Man, Leiderdorp (NL); Timothy L. Paris, Van Nuys, CA (US)

(73) Assignee: Avery Dennison Corporation, Pasadena, CA (US)

( * ) Notice: Subject to any disclaimer, the term of this patent is extended or adjusted under 35 U.S.C. 154(b) by 241 days.

(21) Appl. No.: 10/335,448

(22) Filed: Dec. 31, 2002

(65) Prior Publication Data

US 2004/0126603 A1 Jul. 1, 2004

(51) Int. Cl.
*C08G 18/00* (2006.01)
(52) U.S. Cl. .................. 524/730; 525/124; 428/343
(58) Field of Classification Search ................ 428/343; 524/730; 525/124
See application file for complete search history.

(56) References Cited

U.S. PATENT DOCUMENTS

| | | | | |
|---|---|---|---|---|
| 5,629,374 A | 5/1997 | Budde et al. | ................ | 524/549 |
| 5,643,669 A | 7/1997 | Tsuei | ........................... | 428/354 |
| 5,688,573 A | 11/1997 | Goeb et al. | ................ | 428/40.1 |
| 5,783,303 A | 7/1998 | Tsuei | ........................... | 428/354 |
| 6,001,947 A | 12/1999 | Brunnemann et al. | ........ | 528/28 |
| 6,284,037 B1 | 9/2001 | Sapper | ........................ | 106/499 |

FOREIGN PATENT DOCUMENTS

| | | |
|---|---|---|
| EP | 424 705 A2 | 10/1990 |
| WO | 98/45347 | 10/1998 |
| WO | 99/16805 | 4/1999 |

OTHER PUBLICATIONS

NeoPac R-9000; Bulletin R-9000; Aug., 2000.
NeoPac R R-9699; Bulletin R-9699; Dec., 2001.
Acronal Optive® 110; Architectural Coatings Raw Materials; Straight Acrylic Resin for Semi-Gloss Paints at 150 g/l VOC with Superior Block Resistance; BASF; Revised Jul. 16, 2001.
Acronal® 296 D; Architectural Coatings Raw Materials; Styrene Acrylic Latex for General Purpose Interior and Exterior Coatings; BASF; Revised Sep. 10, 2001.
Acronal Optive® 310; Architectural Coatings Raw Materials; Styrene Acrylic Latex Polymer for High Gloss Wall and Trim Paints with Stain Resistance at 150 g/l VOC; BASF; Revised Oct. 29, 2001.
Acronal Optive® 320; Architectural Coatings Raw Materials; Straight Acrylic Resin for High Gloss Wall & trim Paints with Excellent Lanolin Resistance; BASF; Revised Jun. 2002.
Kronos 4102 Data Sheet.

*Primary Examiner*—Daniel Zirker
(74) *Attorney, Agent, or Firm*—Renner, Otto, Boisselle & Sklar, LLP

(57) ABSTRACT

This invention relates to an aqueous film-forming mixture which does not contain a vinyl halide and which can be utilized to prepare conformable films which are useful in various applications such as adhesive tapes, labels and decorative sheets. The aqueous film-forming mixtures generally comprise, based on the weight of the solids in the aqueous mixture, (A) from about 50% to about 80% by weight of an acrylic-urethane copolymer which forms a film having an elongation at break of at least about 300%, and (B) from about 5% to about 25% by weight of an acrylic polymer or copolymer having a $T_g$ of less than about 55° C., wherein the acrylic polymer or copolymer (B) is different from the acrylic-urethane copolymer (A). The aqueous mixtures also may contain up to about 40% by weight of a pigment. These aqueous film-forming mixtures are useful in preparing conformable films and other articles such as adhesive articles which comprise an adhesive layer and a layer of the conformable film of this invention which is adhered to the adhesive layer. The conformable films of the present invention may be printed with various graphics, and the films are die-cuttable.

19 Claims, No Drawings

AQUEOUS FILM-FORMING MIXTURES AND CONFORMABLE FILMS AND ARTICLES MADE THEREFROM

TECHNICAL FIELD OF THE INVENTION

This invention relates to aqueous film-forming mixtures useful in particular for preparing films which have a high degree of conformability. The conformable films are useful in graphics applications, especially in exterior graphic applications.

BACKGROUND OF THE INVENTION

Vinyl films plasticized with plasticizers have been used for many years in adhesive labels, tapes and decorative sheets. Vinyl films, particularly polyvinyl chloride (PVC) films, have had wide acceptance for such applications because, among other things, they are inexpensive and weather resistant and can be colored easily with pigments and dyes. In addition, plasticized polyvinylchloride has had particularly wide acceptance because its properties can be modified over a wide range by the incorporation of plasticizers. These films have been used in various graphic applications with success. When the films are used in the application of large format graphics onto commercial vehicles or vans with deep/corrugated body panels, the films must conform and adhere to the shape of the truck or van, and must also conform and adhere to the various imperfections and/or bolts and nuts on the surface of the truck or van. A graphic which is applied to an uneven substrate must conform through elongation to adhere to the surface. Without good adhesion, the graphic will lack integrity, and weather conditions will cause separation and failure. Additionally, if the graphic is not conformable, it will present an unacceptable aesthetic appearance. Additional plasticizers can be added to the PVC formulation to make the film soft and flexible, but too much plasticizer in the formulation can be a problem because the migration of the plasticizer into the adhesive coating. Also, the adhesive properties may be altered or destroyed when the plasticizer migrates from the polyvinyl chloride into the adhesive coating.

Although vinyl films have been useful in graphic applications because of their superior flexibility and conformability, there is a continuing need to develop films which do not contain PVC. The halogen-containing materials such as PVC have generally been recognized as producing undesirable by-products when burned.

The invention described herein relates to the use of non-halogen containing polymers for preparing conformable films which are flexible and which exhibit increased conformability over corrugations and into the recessed areas of van and truck body panels.

SUMMARY OF THE INVENTION

This invention relates to an aqueous film-forming mixture which does not contain a vinyl halide and which can be utilized to prepare conformable films which are useful in various applications such as adhesive tapes, labels and decorative sheets. The aqueous film-forming mixtures generally comprise, based on the weight of the solids in the aqueous mixture, (A) from about 50% to about 80% by weight of an acrylic-urethane copolymer which forms a film having an elongation at break of at least about 300%, and (B) from about 5% to about 25% by weight of an acrylic polymer or copolymer having a $T_g$ of less than about 55° C., wherein the acrylic polymer or copolymer (B) is different from the acrylic-urethane copolymer (A). The aqueous mixtures also may contain up to about 40% by weight of a pigment. These aqueous film-forming mixtures are useful in preparing conformable films and other articles such as adhesive articles which comprise an adhesive layer and a layer of the conformable film of this invention which is adhered to the adhesive layer. The conformable films of the present invention may be printed with various graphics, and the films are die-cuttable.

DETAILED DESCRIPTION OF THE EMBODIMENTS

As described above, the invention relates to, in one embodiment, an aqueous film-forming mixture comprising, based on the weight of the solids, of (A) from about 50% to about 80% by weight of an acrylic-urethane copolymer which forms a film having an elongation at break of at least about 300%, and (B) from about 5% to about 25% by weight of an acrylic polymer or copolymer having a $T_g$ of less than about 55° C., wherein the acrylic polymer or copolymer (B) is different from the acrylic-urethane polymer or copolymer (A). In another embodiment, the aqueous mixture may contain up to about 40% by weight of at least one pigment. The films which are formed from the aqueous film-forming mixtures of the invention are characterized as being flexible and conformable.

A conformable film in accordance with this invention is defined as a film which is characterized as having an elongation at break of at least 100%. In another embodiment, a conformable film is a film characterized as having an elongation at break of at least 100% and a stress relaxation of less than about 4 Newtons or even less than about 3 Newtons. In other embodiments, the elongation at break may be at least 150% or even 200%.

The major component of the aqueous mixtures of the present invention is an acrylic-urethane copolymer (i.e., a polymer containing urethane moieties and acrylic moieties. This copolymer may be present in the aqueous mixture in an amount of from about 50% to 80% by weight, based on the total weight of solids in the aqueous mixture. In other embodiments, the acrylic-urethane copolymer is present in amounts of from about 55% to about 75%, and in another embodiment, in an amount from about 60% to about 70% by weight, based on the total weight of solids in the aqueous mixture. Here, and elsewhere in the written description, the range and ratio limits recited herein may be combined. Suitable acrylic-urethane copolymers in the aqueous mixtures of the present invention are those copolymers which form a film having an elongation at break of at least about 300%. That is, the copolymer itself forms a film having this elongation at break. In other embodiments, the acrylic-urethane copolymer utilized in the aqueous mixture is one which forms a film having an elongation at break of at least about 400% or even at least about 500%. In one embodiment, the elongation at break of useful film may be as high as 700 or even 800.

Suitable acrylic-urethane copolymers for use in the aqueous mixtures of the present invention also are those which also are capable of forming stable dispersions in water. In one embodiment, the acrylic-urethane copolymers are aliphatic acrylic-urethane copolymers with acid numbers of from about 15–16. Acrylic-urethane copolymers useful in the aqueous mixtures of the present invention are available commercially from a variety of sources. For example, a useful acrylic-urethane copolymer is commercially available under the trade designation "NeoPac R-9000" from Zeneca Resins, Inc., Wilmington, Mass. This acrylic-urethane copolymer is a solvent-free aliphatic urethane acrylic copolymer. NeoPac R9000 is available as an aqueous mixture containing 40% solids and 1.2% triethylamine as a stabilizer. A free film prepared from NeoPac R9000 has an elongation at break of 620%. The acid number of NeoPac R9000, on solids, is 16. Other useful acrylic-urethane copolymers having the desired characteristics are known in the art. A number of aqueous dispersions of acrylic-urethane copolymers are described in EP Publication No. 0,424,705 A2 and in WO 98/45347. Any of these copolymers which form films having an elongation at break of at least about 300% can be used in the present invention.

The aqueous film-forming mixtures of the present invention also contain (B) from about 5% to about 25% by weight of an acrylic polymer or copolymer having a $T_g$ of less than about 55° C., based on the weight of the solids in the aqueous mixture. In another embodiment, the aqueous film-forming mixture comprises from about 7 to about 20% of the acrylic polymer or copolymer having a $T_g$ of less than about 55° C. In yet another embodiment, the acrylic polymer or copolymer (B) utilized in the aqueous mixtures of the present invention is characterized as having a $T_g$ of between about −15° to about 50° C.

The acrylic copolymers may be based on from 30% to 60% by weight of $C_1$–$C_8$ alkyl (meth)acrylate monomer, from 30% to 60% by weight of vinyl aromatic monomers and from 0.5% to 10% by weight of (meth)acrylic acid. The $C_1$–$C_8$ alkyl (meth)acrylate monomers may be linear or branched chain derivatives. Examples include methyl acrylate, methyl methacrylate, ethyl acrylate, ethyl methacrylate, n-propylacrylate-propyl methacrylate, isobutyl methacrylate, etc.

Examples of vinylaromatic monomers present as monomer units in the acrylate copolymer include styrene, α-alkyl-styrene and vinyltoluene.

The acrylate copolymer can be prepared by techniques known from the prior art, an example being emulsion polymerization. The acrylate polymer is usually employed in the form of a dispersion. During the preparation process, the ratio between the monomers and the water is preferably established such that the resultant dispersion has a solids content of from 30 to 60% by weight, preferably from 35 to 60% by weight, and the dispersion can be used directly to prepare the aqueous mixture. Examples of commercially available dispersions of such copolymers wherein the vinyl aromatic monomer is styrene are Acronal 290D (Europe) and Acronal 296D (U.S.) from BASF AG.

A variety of acrylic polymers and copolymers having the desired $T_g$ and which are useful in the aqueous mixtures of the present invention are available commercially. Examples of useful acrylic polymers and copolymers are listed in the following Table I.

TABLE I

Acrylic Polymers and Copolymers

| Trade Designation | | Source | % Solids | Type | $T_g$ (° C.) |
|---|---|---|---|---|---|
| Acronal Optive | 100 | BASF | 50 | Acrylic | 18 |
| | 110 | BASF | 46 | Acrylic | 16 |
| | 296D | BASF | 50 | Styrene-Acrylic | 20 |
| | 300 | BASF | 50 | Acrylic | 2 |
| | 310 | BASF | 45 | Styrene- | 38 |

TABLE I-continued

Acrylic Polymers and Copolymers

| Trade Designation | | Source | % Solids | Type | $T_g$ (° C.) |
|---|---|---|---|---|---|
| | | | | Acrylic | |
| | 320 | BASF | 47 | Acrylic | 50 |
| Nacrylic | 2550 | National Starch | 50 | Acrylic | 22 |
| | CP3650 | National Starch | 45 | Acrylic | 50 |
| | 6408 | National Starch | 45 | Acrylic | 51 |
| | 6435 | National Starch | 40 | Acrylic | 35 |
| Rhoplex | E2780 | Rohm & Haas | 48.5 | Acrylic | −10 |

The aqueous mixture used in the present invention may include other additives such as pigments, fillers, flattening agents, light stabilizers, coupling agents, adhesion promoters, rheology control agents, surfactants, and the like, that are compatible with water-based systems. Any of these components can be used in various combinations, including two or more of each type of compound, to achieve desired results.

In one embodiment, the aqueous mixtures may contain from 0 to about 40% by weight, based on the total weight of solids in the aqueous mixture of a pigment. In other embodiments, the mixtures may contain from about 20% to about 40% or from about 25% to about 35% by weight of one or more pigments.

Pigments, suitable for use in water-based systems, are well known in the art. Inorganic fillers and pigments can be included in the aqueous mixtures to provide opaque films. Useful pigments include calcium carbonate, carbon blacks, titanium dioxide, etc. Blends of two or more pigments also may be used. A number of useful titanium dioxide pigment slurries are available commercially such as from DuPont (e.g., R-706, R-746, R-942, etc.) and Kronos Titan, Germany (e.g., Kronos 4102 and 4311). Phosphorescent pigments, i.e., compounds that glow in the dark, also are useful colorants. Suitable phosphorescent pigments include, for example, phosphorescent pigment available under the trade designation "Excite 2330LBY" from LJSR OPTONIX Inc., Hackettstown, N.J. A pigment, or mixture of pigments, is typically used in an amount effective to provide the desired color.

One or more rheology control agents (thickeners) may be included in the aqueous film-forming mixtures of the present invention to increase the viscosity of the dispersions, and the agent is incorporated into the aqueous mixtures in amounts which prevent sagging or running after the mixture is coated on a carrier to form the film. Inclusion of rheology control agents also allows for the application of thicker coatings to form thicker films. Suitable agents are those that are compatible with urethane-acrylic dispersions. As used herein, "compatible" means that the component does not have adverse effects on the aqueous mixture composition (e.g., precipitation, flocculation, or other separation of the components), on the film formed from the aqueous mixture. In one embodiment, the thickeners are associative thickeners. An "associative" thickener is a polymeric compound having hydrophobic groups that associate with the dispersed polymer particles in the aqueous mixture. This association is believed to result in adsorption of the thickener molecule onto the dispersed polymer particles.

One useful associative thickener is a polyurethane available under the trade designation "DSX-1514" from Cognis, Dusseldorf, Germany, and this thickener is an aqueous dispersion of a polyurethane having 38–42% w solids. It is a high shear and low molecular weight thickener having a Brookfield viscosity of 2000–5000 mPa at 23° C. It is particularly desirable because it provides a significant increase in viscosity of the aqueous mixture when used in small amounts.

A thickener, or mixture of thickeners, may be present in the aqueous mixtures of the present invention in an amount effective to increase the viscosity and stability of the dispersions and provide films having the desired properties. Generally, a thickener, or mixture of thickeners, is present in the aqueous mixture of the present invention in an amount of less than about 1% w, and more preferably, in an amount of about 0.05–0.8% w, based on the total weight of the aqueous mixture (including water).

Surfactants also may be included in the aqueous mixtures used in the present invention to reduce foaming and to enhance leveling and wetting. This is important to provide smooth, uniform films. A wide variety of surfactants, i.e., surface-active agents, are suitable for use in the curable coating compositions of the present invention. Typically, additives that are suitable for use in water-based systems that perform the functions of a defoamer, leveling agent, and/or wetting agent, for example, are suitable. Suitable surfactants include, but are not limited to, flow control agents, wetting agents, dispersants, adhesion enhancers, defoamers, etc. The surfactants may be nonionic or anionic. Examples of useful surfactants are available under the general trade designations Surfynol (Air Products), Triton (Union Carbide), Silwet (OSi Specialties, Inc.), etc. Specific examples include Surfynol SEF is a nonionic surfactant; Triton N-42 is a nonylphenoxy polyethoxyethanol; and Silwet L-77, a nonionic silicone glycol copolymer.

A surfactant, or mixture of surfactants, may be present in the aqueous mixtures in an amount effective to provide a smooth, uniform coating. Generally, a surfactant, or mixture of surfactants, is present in the curable coating compositions of the present invention in an amount of about 0.1–3 wt-%, based on the total weight of the aqueous mixture (including water).

Flattening agents may be included in the aqueous mixtures of the present invention to reduce the reflective characteristics (i.e., gloss) of the cured coating. Suitable flattening agents are those that are compatible with water-based systems. Particularly suitable flattening agents are silica flattening agents, which are available under the trade designations "Lo-Vel 27" and "Lo-Vel 275" (ultrafine amorphous silica) from PPG Industries, Inc., Pittsburgh, Pa. A flattening agent, or mixture of flattening agents, is typically used in an amount effective to provide the desired level of gloss to the cured coating, which is well known to one of skill in the art.

Light stabilizers may be used in the aqueous mixtures of the present invention to enhance the UV stability of the conformable films. Suitable UV scavengers and absorbers are those that are compatible with water-based systems. One suitable UV scavenger is available under the trade designation "Tinuvin 123 (a bis(2,2,6,6-tetramethyl-4-piperidinyl) ester of decanedioic acid), which is the reaction product of 1,1-dimethylethylhydroperoxide and octane) from Ciba-Geigy Corporation, Tarrytown, N.Y. Another suitable light stabilizer is "Tinuvin 1130" (a substituted hydroxyphenyl benzotriazole) from Ciba-Geigy Corporation, Tarrytown, N.Y. Hindered amine light stabilizers (HALS) comprise another group of useful stabilizers. HALS are described and exemplified in some detail in U.S. Pat. No. 4,721,531, cols. 4–9. Such HALS may be, for example, derivatives of 2,2,6,6-tetraalkyl piperidines or substituted piperizinediones. Tinuvin 292 is an example of a useful hindered amine light stabilizer, and is reported to be a mixture of bis(1,2,2,6,6-pentamethyl-4-piperidinyl) sebacate and methyl (1,2,2,6,6-pentamethyl-4-piperidinyl) sebacate typically used in an amount effective to provide the desired UV stability. Another useful UV stabilizer is available commercially from Clariant Corp., Augsberg, Germany under the designation Sanduvor S-3225. This stabilizer is a dispersion identified as a 2:1 blend of 2-(5-chloro-2H-benzotriazol-2-yl)-6(1,1-dimethyl-ethyl)-4-methylphenol and 2,2,4,4-tetramethyl-7-oxa-3,20-diazodispiro [5.1.11.2] heneicosan-21-on.

The aqueous film-forming mixtures of the present invention generally do not require incorporation of any cross-linking agents for film formation. However, in some embodiments it may be useful to include a cross-linking agent in the aqueous mixture.

The following Examples describe the aqueous film-forming mixtures of the present invention and the preparation thereof. Unless otherwise indicated in the Examples, in the claims, and elsewhere in this written description, all parts and percentages are by weight, the temperature is in degrees centigrade, and the pressure is at or near atmospheric pressure.

Aqueous mixtures of the present invention which are illustrated in Examples 1–23 are prepared in general by the following procedure. The acrylic polymer or copolymer is mixed with parts of the titanium dioxide slurry (about 76% solids) in a vessel using a mixer at 500 rpm. The acrylic-urethane copolymer is added to the mixture under stirring, and the vessel content is mixed an additional 15 minutes. To this mixture there is then added, while stirring, 0.3 part of Sanduvor 3225 (UV stabilizer), 0.4 part of Surfynol SEF (surfactant) and 2.5 parts of DSX1514 (thickener) diluted to 50% with water. The mixture in the vessel is mixed an additional 30 minutes, and the mixture is filtered through a 100 micron filter.

TABLE II

Examples 1–23
Formulations

| Example | Acrylic-Urethane | Parts by wt. | Acrylic Polymer or Copolymers | Parts by wt. | Pigment | Parts by wt. |
|---|---|---|---|---|---|---|
| 1 | R-9000 | 50 | Nacrylic CP 3650 | 4.6 | DuPont R-746 | 11.2 |
| 2 | R-9000 | 50 | Nacrylic 6408 | 4.6 | Kronos 4311 | 11.2 |
| 3 | R-9000 | 50 | Nacrylic 6408 | 4.6 | DuPont R-746 | 11.2 |
| 4 | R-9000 | 50 | Nacrylic 2550 | 4.6 | Kronos 4311 | 11.2 |
| 5 | R-9000 | 50 | Nacrylic 2550 | 4.6 | DuPont R-746 | 11.2 |
| 6 | R-9000 | 50 | Acronal 100 | 4.6 | DuPont R-746 | 11.2 |

TABLE II-continued

Examples 1–23 Formulations

| Example | Acrylic-Urethane | Parts by wt. | Acrylic Polymer or Copolymers | Parts by wt. | Pigment | Parts by wt. |
|---|---|---|---|---|---|---|
| 7 | R-9000 | 50 | Acronal 100 | 4.6 | Kronos 4311 | 11.2 |
| 8 | R-9000 | 50 | Acronal 110 | 4.6 | Kronos 4311 | 11.2 |
| 9 | R-9000 | 50 | Acronal 110 | 4.6 | DuPont R-746 | 11.2 |
| 10 | R-9000 | 50 | Acronal 110 | 5.8 | DuPont R-746 | 11.2 |
| 11 | R-9000 | 50 | Acronal 110 | 7.0 | DuPont R-746 | 11.2 |
| 12 | R-9000 | 50 | Acronal 110 | 8.5 | DuPont R-746 | 11.2 |
| 13 | R-9000 | 50 | Acronal 110 | 8.5 | Kronos 4311 | 11.2 |
| 14 | R-9000 | 50 | Acronal 110 | 12.4 | Kronos 4311 | 11.2 |
| 15 | R-9000 | 48.7 | Acronal 110 | 4.98 | Kronos 4311 | 12.12 |
| 16 | R-9000 | 47.1 | Acronal 110 | 5.42 | Kronos 4311 | 13.2 |
| 17 | R-9000 | 60 | Acronal 110 | 4.6 | Kronos 4311 | 13.0 |
| 18 | R-9000 | 50 | Acronal 110 | 4.6 | Kronos 4311 | 15.0 |
| 19 | R-9000 | 50 | Acronal 300 | 4.6 | DuPont R-746 | 11.2 |
| 20 | R-9000 | 50 | Acronal 300 | 4.6 | Kronos 4311 | 11.2 |
| 21 | R-9000 | 50 | Acronal 310 | 4.6 | DuPont R-746 | 11.2 |
| 22 | R-9000 | 50 | Acronal 310 | 4.6 | Kronos 4311 | 11.2 |
| 23 | R-9000 | 50 | Rhoplex E-2780 | 4.6 | DuPont R-746 | 11.2 |

The aqueous mixtures of the present invention, such as those described above, are useful in particular in preparing conformable films. In one embodiment, the films are formed by casting of a coating of the aqueous mixture onto a removable support by techniques well known to those skilled in the art. Examples of such techniques include screen printing, spraying, flow coating, knife coating, (e.g., knife over roll) or reverse roll coating. The choice of the technique utilized to form the coating depends upon factors such as the desired film thickness, the viscosity of the aqueous mixture, and desired film quality. In one embodiment, a release paper is used as a removable support. An example of such a removable support is a kraft paper coated with a synthetic acrylic resin. The aqueous mixtures are applied to the release support and placed in an oven. In this oven, the water is evaporated and the polymer particles fuse resulting in a dry film on the casting paper, and the dry film is easily removed from the casting paper. Films prepared in these manners may range in thickness from about 1 to about 5 mils. In one embodiment, the thickness if from about 2 to about 5 mils.

The films which are prepared from the aqueous film-forming mixtures of the present invention are characterized as being flexible and having a high degree of conformability. In one embodiment, the films of the invention are characterized as having an elongation at break of at least 100%. In other embodiments, the elongation at break of the films of the present invention may be at least about 150% or even at least about 200%. In another embodiment, the films of the present invention may be characterized as having a stress relaxation of less than about 4 Newtons. In other embodiments, the stress relaxation of the films of the invention may be less than 3 Newtons or even less than 2 Newtons. In yet another embodiment of the invention, the films are characterized as having an elongation at break of at least 100% and a stress relaxation of less than 4 Newtons.

The elongation at break of the films of the present invention is determined utilizing an electronic tensile tester wherein a rectangular test piece of defined width is stretched at a constant rate of elongation, and the elongation at break is the extension of the test piece at the moment of rupture expressed as a percentage of the initial test length. In this test, five test pieces of 25 mm width and at least 150 mm length are cut from the film to be tested. Each of the test pieces should be free from creases, obvious flaws or other visual defects, and free of obvious imperfections on the cut edges. The tensile tester is set for the following conditions: distance between the grips: 100 mm; grip separation speed: 200 mm/min.; force reading set to 0; and the displacement reading is set to 0. The samples are conditioned for at least 4 hours at 23°±2° C. and 50% RH±5), and the samples are tested at 23° C.±1° C.

The test piece is placed in the grips with the metal of the test piece in line with the points of attachment of the grips to the machine. The grips are tightened firmly to prevent the test piece from slipping, but not to the extent that the test piece is damaged. The pretension applied to the test piece must be in the range of 0.2 to 0.5 N. The tester is started, and the sample is stretched at a constant rate until the sample breaks. The covered distance at break is recorded. The elongation at break is then calculated using the formula $$\text{Elongation at break} = \frac{\Delta l}{l} \times 100\%$$

wherein $\Delta l$=the extension of the test piece at rupture, and $l$=the initial distance between the grips.

The stress relaxation properties of the films of the present invention is measured also utilizing a tensile tester. A sample of the film (150 mm in length) is placed between the grips providing a grip to grip distance of 25 mm. The test speed is 100 mm/min., and the test is executed by stretching the film 13%, and the film is maintained at this elongation of 13% for 12 minutes. During this time, the force is reduced due to the relaxation of the sample, and the force at 12 minutes is recorded as the stretch relaxation of the film.

The elongation at break and the stress relaxation of films prepared from the aqueous mixtures of Examples 1–23 are summarized in the following Table II. The films are prepared by coating on a release liner with a knife coater or die coater. The thickness of the deposited coating is sufficient to provide a film thickness of about 2 mils after drying in an oven at 70° C. for 15 minutes.

TABLE III

Film Properties

| Film Example | Source Example | % Strain at Break | Stress |
|---|---|---|---|
| A | 1 | 236 | 2.5 |
| B | 2 | 209 | 3.4 |
| C | 3 | 244 | 3.2 |
| D | 4 | 247 | 2.6 |
| E | 5 | 254 | 2.6 |
| F | 6 | 296 | 1.97 |
| G | 7 | 315 | 1.7 |
| H | 8 | | |
| I | 9 | 231 | 1.72 |
| J | 10 | 244 | 1.82 |
| K | 11 | 276 | 1.71 |
| L | 12 | 111 | 1.58 |
| M | 13 | 264 | 2.37 |
| N | 14 | 221 | 2.04 |
| O | 15 | 242 | 2.65 |
| P | 16 | 212 | 2.59 |
| Q | 17 | 249 | 2.56 |
| R | 18 | 226 | 2.71 |
| S | 19 | 289 | 1.93 |
| T | 20 | 341 | 1.74 |
| U | 21 | 317 | 1.93 |
| V | 22 | 354 | 1.97 |
| W | 23 | 354 | 2.3 |

In one embodiment, the conformable films of the present invention are combined with a layer of adhesive to form adhesive articles such as labels and signs. The adhesive layer may comprise pressure sensitive adhesives or heat activated adhesives which are well known to those skilled in the art. The adhesive layer of the adhesive articles can be protected by a release liner which is releasably adhered to the adhesive. Silicone treated paper is an example of a useful release liner. The adhesive articles of the present invention are readily die-cuttable into various shapes and sizes.

While the invention has been explained in relation to several embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A conformable film having an elongation at break of at least about 100% prepared from an aqueous film-forming mixture free of PVC and comprising, based on the weight of the solids in the aqueous mixture, (A) from about 50% to about 80% by weight of an acrylic-urethane copolymer which forms a film having an elongation at break of at least about 300%. (B) from about 5% to about 25% by weight of an acrylic polymer or copolymer having a $T_g$ of less than about 55° C. wherein the acrylic polymer or copolymer (B) is not an acrylic-urethane copolymer and (c) from about 20% to about 40% by weight of at least one pigment.

2. The film of claim 1 wherein the conformable film is also characterized as having a stress relaxation of less than about 4 Newtons.

3. The film of claim 1 characterized as having an elongation at break of at least about 150%.

4. The film of claim 1 wherein the $T_g$ of the acrylic polymer or copolymer (B) is from about −15° to about 50° C.

5. The film of claim 1 wherein the acrylic-urethane copolymer (A) is an aliphatic urethane-acrylic copolymer.

6. The film of claim 1 wherein the pigment is titanium dioxide.

7. An adhesive article comprising an adhesive layer having a first surface and a second surface, and the film of claim 1 adhered to the first surface of the adhesive layer.

8. The adhesive article of claim 7 wherein the adhesive layer is a pressure sensitive adhesive layer.

9. The adhesive article of claim 7 wherein the acrylic-urethane copolymer (A) included in the aqueous mixture used to form the film is an aliphatic urethane-acrylic copolymer.

10. The adhesive article of claim 7 wherein the pigment is titanium dioxide.

11. A conformable film having an elongation at break of at least about 100% prepared from an aqueous film-forming mixture free of PVC and comprising, based on the weight of the solids in the aqueous mixture, (A) from about 55% to about 75% by weight of an acrylic-urethane copolymer which forms a film having an elongation at break of at least about 300%, and (B) from about 7% to about 20% by weight of an acrylic polymer or copolymer having a $T_g$ of less than about 55° C., and (C) from 20 to about 40% by weight of at least one pigment, wherein the acrylic polymer or copolymer (B) is not an acrylic-urethane copolymer.

12. The film of claim 11 wherein the conformable film is also characterized as having a stress relaxation of less than about 4 Newtons.

13. The film of claim 11 characterized as having an elongation at break of at least about 150%.

14. The film of claim 11 characterized as having an elongation at break of at least about 200%.

15. The film of claim 11 wherein the $T_g$ of the acrylic polymer or copolymer (B) is from about −15° to about 50° C.

16. The film of claim 11 wherein the acrylic-urethane copolymer (A) is an aliphatic urethane-acrylic copolymer.

17. The film of claim 11 wherein the aqueous mixture also comprises as least one rheology control agent.

18. The film of claim 11 wherein the pigment is titanium dioxide.

19. The film of claim 11 wherein the film is characterized as having a stress relaxation of less than about 2 Newtons.

* * * * *